Sept. 10, 1935.  J. TELLER ET AL  2,013,931

GAS OR ELECTRIC COOKING RANGE AND STOVE

Filed Jan. 15, 1932  3 Sheets-Sheet 1

INVENTOR.
Jacob Teller and
BY Arthur P Schug
E.E. Weaver
ATTORNEY.

Sept. 10, 1935. J. TELLER ET AL 2,013,931
GAS OR ELECTRIC COOKING RANGE AND STOVE
Filed Jan. 15, 1932 3 Sheets-Sheet 2

INVENTOR.
Jacob Teller and
BY Arthur P. Schulz
ATTORNEY.

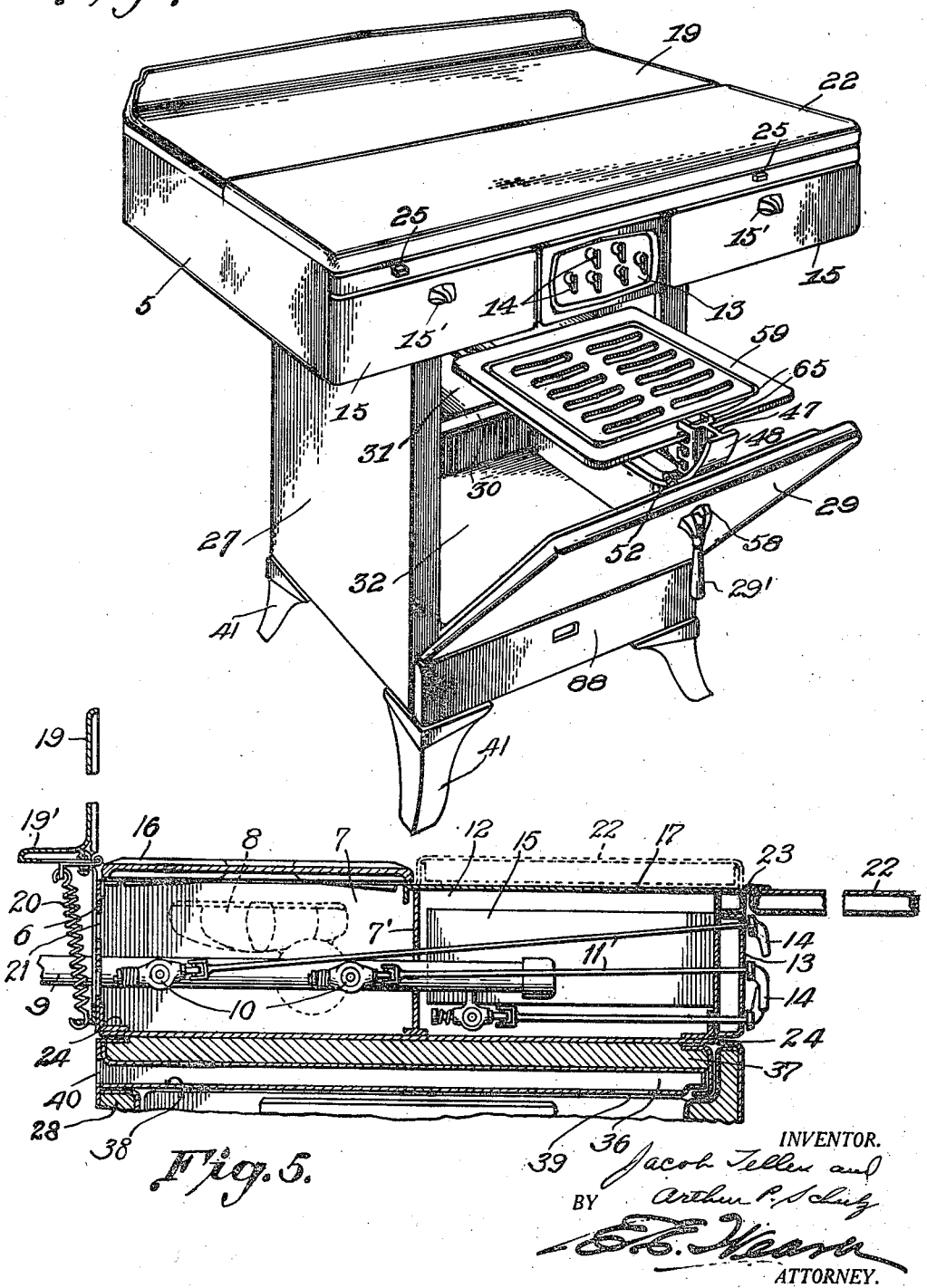

Patented Sept. 10, 1935

2,013,931

UNITED STATES PATENT OFFICE 2,013,931

GAS OR ELECTRIC COOKING RANGE AND STOVE

Jacob Teller, New Rochelle, and Arthur P. Schulz, New York, N. Y., assignors to Teller Stove Designing Corporation, New York, N. Y., a corporation of New York Application January 15, 1932, Serial No. 586,912

6 Claims. (Cl. 126—37)

This invention relates generally to gas or electric cooking apparatus and particularly to a combination oven, broiler and table-top and straight line range or stove and is designed to provide a construction in which a maximum cooking space and work top area are provided in association with a relatively smaller low oven and low broiler.

Among the various objects and advantages of the present construction is that of providing a combined cooking and table-top section which may be arranged to present at one time a straight-line cooking surface associated with a table top work space; at another time, such a cooking surface associated with a working table top having approximately twice the area of the space first mentioned; at another time, a work top having an area of approximately three times that of the space first mentioned, and at still another time, a flush table top surface in which the cooking surface is entirely covered and the apparatus presents a practical buffet for such uses as that to which a housewife may wish to put it. It will be observed that the said top section is capable of other combinations, as will be evident upon reference to the several figures of the drawings.

In the accompanying drawings,

Figure 4 is a perspective view of the range with the top entirely closed, but showing the oven and broiler compartment door open and the broiler pan and support moved outwardly by the said door; and Figure 5 is a transverse vertical sectional view through the upper portion of the range on substantially the line 3—3 of Fig. 3.

Figure 1:
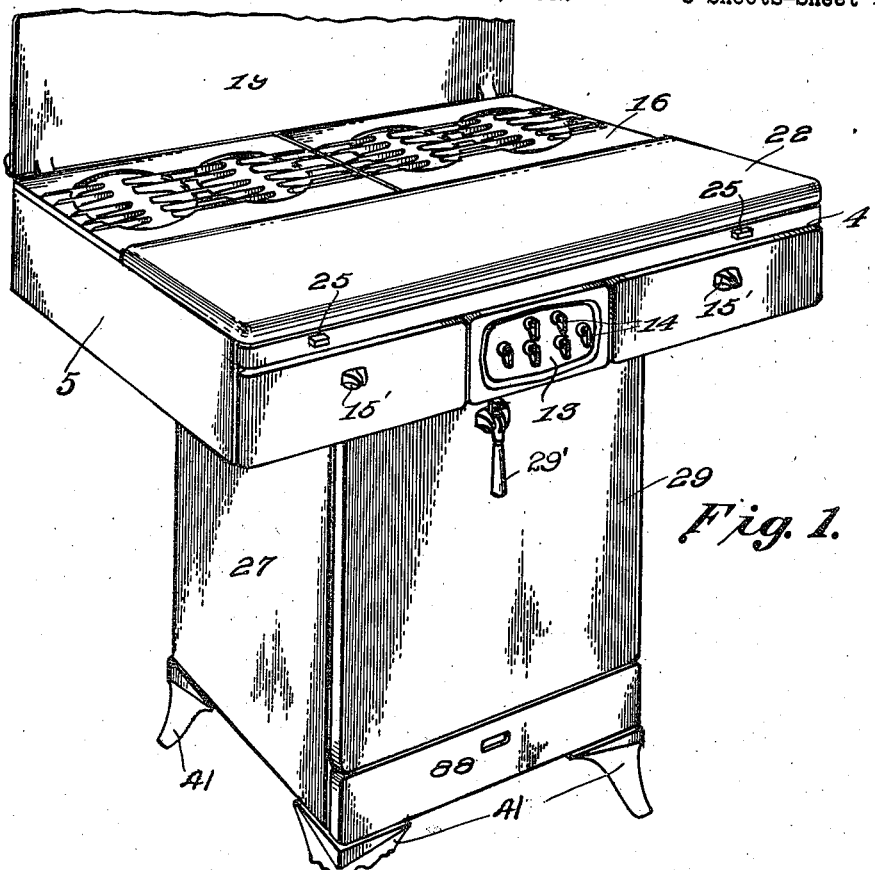
Figure 1 is a front perspective view of the range with the grid cover raised.

Referring now to the drawings by numerals of reference, 1 indicates generally the stove or range, the combined cooking and table-top at 2, and the low oven at 32.

Figure 2:
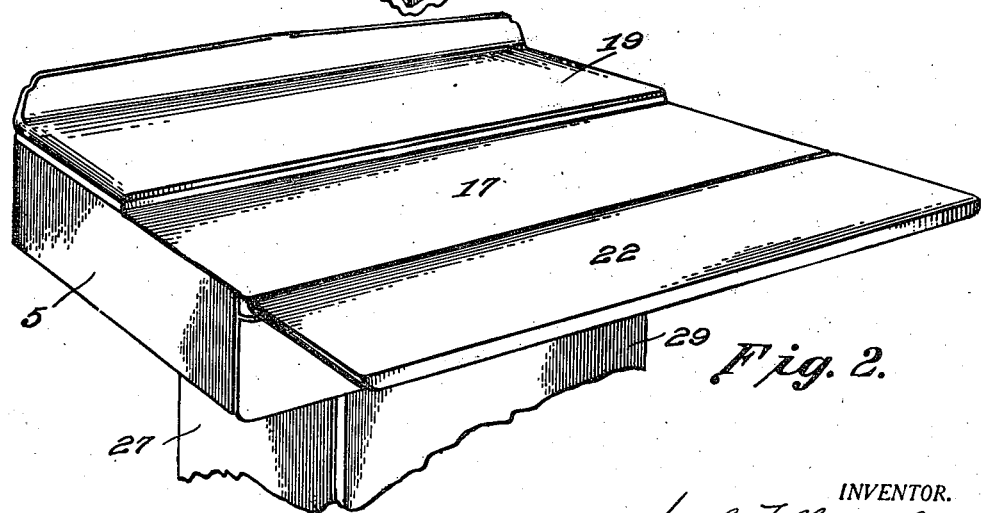
Figure 2 is a perspective view of the combined cooking and table top section with the extension work table leaf extended.

With particular reference to Figures 1 and 2, we have shown the main body portion of the range, which includes the said low oven as supporting the cooking and table-top 2, the latter being of an elongated rectangular form and including a front portion, generally indicated at 4, side plate members 5 and a rear plate member 6.

These members provide a front and a rear compartment the latter of which houses the burners 8, and the valves for which burners are controlled through the medium of operating rods which extend through the panel 13, where they are operated by handles 14. The rear compartment 7 which houses the burners and associated parts may be separated from the forward compartment by a central longitudinal partition 7'.

The forward compartment below the top may contain drawers 15 suitably mounted in any preferred and conventional manner and may serve to receive kitchen utensils or other appliances, said drawers having handles 15'.

The combined cooking and table-top includes a rear longitudinal grid section 16 arranged above the burners, said grid section being preferably cast in sections for convenience of removal when necessary to have access to the said burners or their compartment and a forward longitudinal working or table-top plane or flat surface section 17. The grid section is capable of being covered when not in use by a hinged cover 19, mounted at the upper edge of the rear plate member 6, said cover being suitably counterbalanced by a tension spring 20. The rear burner compartment is suitably ventilated for cooking purposes by providing the rear plate 6 with openings 21.

At its front edge, the forward longitudinal work or table top section 17 is provided with a leaf 22, hinged at 23, as shown in Figure 5, said leaf being coextensive in width and length to that of the work section which at times it is adapted to cover as shown in Figure 1. In opened position, as shown in Figures 2 and 3, it serves as an addition to the work top section and affords a rather extensive surface upon which the person using the range may work, either when the range is not in use and the grids covered, as in Figure 2, or when in use as in Figure 3.

The contsruction is such that when the range is entirely closed as shown in Figure 4, the upper surfaces of the cover plate 19 and that of the leaf 22 are perfectly flush so that an unobstructed and smooth table surface is presented. Specifically, the combined thicknesses of the grid section 16 and the grid cover plate 19 are equal to that of the thickness of the leaf 22, so that the upper surfaces of said leaf and cover, when closed are in the same horizontal plane. This is clear by reference to Figure 5, although it is apparent from other of the figures of the drawings. One of the advantages of providing the range with the forwardly swinging leaf 22 is that it permits the operator to sit up close to the range, leaving sufficient leg room for comfort, as it will readily be seen.

Figure 3:
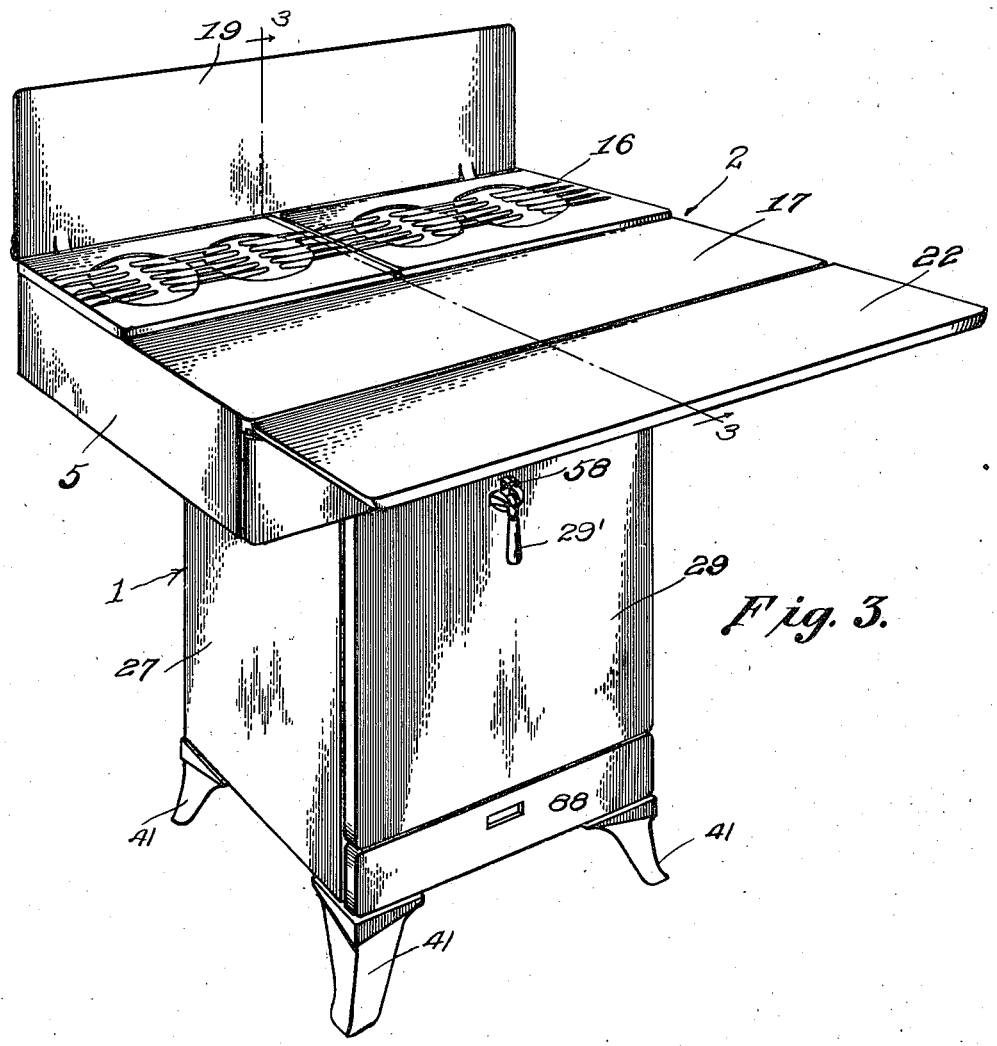
Figure 3 is a view similar to Figure 1, but showing the extension leaf opened in addition to the grid cover raised.

One of the principal features of the present invention relates to a construction in which the combined cooking and table-top is considerably wider than the low supporting oven, so that the former extends laterally upon each side of the side walls of the oven, as clearly illustrated by several of the figures, and principally in Figure 3, in which the lower edges of the walls defining the combined top is provided with rectangular angle iron frame 24 through which it is suitably mounted upon the body of the low oven. This construction and arrangement affords a maximum cooking and working top surface with an oven body relatively smaller in width. The leaf section 22, when opened as shown in Figures 2 and 5, may be supported in horizontal position by providing the front member of the top with studs or knobs 25, although any desired means may be employed for maintaining said leaf in horizontal alinement with the work section 17.

Referring briefly to the low oven construction, it will be observed that it is provided with side and rear insulated walls 27 and 28 respectively, and a front downwardly swinging insulated door 29, having a handle 29', the oven being divided by a horizontal floor partition 30 into an upper broiler compartment 31 and a lower oven compartment 32, the broiler compartment being ventilated by a duct 36 formed between an insulated top plate 37 and a false top plate 38, communication with the broiler compartment being afforded by an opening 39 in the forward portion of said plate 38 and with the atmosphere through openings 40 in the back of the oven body. The entire range structure is supported by appropriate legs 41.

What we claim is:

1. A combined cooking and working top comprising a compartment having a rear series of burners, and a forward working top surface, a movable cover carried by said compartment and adapted to cover and uncover said cooking top, a combined working top cover and leaf secured along the forward side of said working top, and adapted to cover and uncover said working top, said leaf when unfolded cooperating with said working top to provide an extension thereof.

2. A combined cooking and working top comprising a compartment having a plurality of burners arranged longitudinally in the rear thereof, a grid member arranged over said burners, a working surface member extending longitudinally of said combined top and forward of said grid member, a movable cover adapted to cover and uncover said grid member, and a leaf member forming an extension of said working surface member, and adapted to cover and uncover the latter.

3. A combined cooking and working top comprising a compartment having a plurality of burners arranged longitudinally in said compartment at the rear, a grid member supported above said burners, a working top surface longitudinally of said compartment at the front thereof, a movable cover plate for said grid member, a movable cover plate for said work surface, said grid cover and work surface cover when closed being in substantially the same horizontal plane, whereby a smooth table top is provided of an area substantially equivalent to that defined by the walls of said compartment.

4. A combined cooking and working top comprising a compartment having a plurality of burners arranged therein at the rear, a grid member supported above said burners, a working top surface member at the front of said compartment, the upper plane of said grid member being above that of said working top surface, a movable cover for said grid member, and a movable leaf extension for said working top surface member, the thickness of said extension leaf member being substantially equal to combined thickness of said grid cover member and that portion of the grid, above the plane of the working top surface, whereby, when said cover and leaf extension are closed, their top surfaces will be in approximately the same horizontal plane to provide a substantially smooth table top.

5. A combined cooking and working top comprising a cooking section, a working top section, and an extension leaf for said working top section adapted to be moved over said working top section to cover the same, or to be moved into parallel relation therewith in the same horizontal plane.

6. A combined cooking and working top comprising a rear cooking section, a forward working top section, an extension leaf hinged along the outer edge of said working top section, and adapted to be folded thereover or be swung away from said working top section and into the same horizontal plane.

JACOB TELLER.
ARTHUR P. SCHULZ.